US012456070B2

(12) United States Patent
Phan et al.

(10) Patent No.: US 12,456,070 B2
(45) Date of Patent: Oct. 28, 2025

(54) SYSTEM-LEVEL CONTROL USING TREE-BASED REGRESSION WITH OUTLIER REMOVAL

(71) Applicant: INTERNATIONAL BUSINESS MACHINES CORPORATION, Armonk, NY (US)

(72) Inventors: Dung Tien Phan, Pleasantville, NY (US); Pavankumar Murali, Ardsley, NY (US); Lam Nguyen, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 16/998,748

(22) Filed: Aug. 20, 2020

(65) Prior Publication Data
US 2022/0058515 A1    Feb. 24, 2022

(51) Int. Cl.
*G06N 20/00* (2019.01)
*G06F 18/243* (2023.01)
*G06F 18/2433* (2023.01)

(52) U.S. Cl.
CPC ....... *G06N 20/00* (2019.01); *G06F 18/24323* (2023.01); *G06F 18/2433* (2023.01)

(58) Field of Classification Search
CPC ........ G06N 20/00; G06N 20/10; G06N 20/20; G06N 5/01; G06N 5/045; G06F 18/24323; G06F 18/2433
See application file for complete search history.

(56) References Cited

U.S. PATENT DOCUMENTS

| | | |
|---|---|---|
| 5,481,649 A | 1/1996 | Birdwell et al. |
| 6,622,059 B1 | 9/2003 | Toprac et al. |
| 6,678,668 B2 | 1/2004 | Fisher et al. |
| 7,103,509 B2 | 9/2006 | Shah et al. |
| 8,050,900 B2 | 11/2011 | Mitrovic et al. |
| 8,295,966 B2 | 10/2012 | Choi et al. |

(Continued)

FOREIGN PATENT DOCUMENTS

| | | |
|---|---|---|
| CN | 107291065 A | 10/2017 |
| CN | 108170769 A | 6/2018 |

(Continued)

OTHER PUBLICATIONS

Subramanian et al., A Prediction-Optimization Framework for Sitewide Process Optimization, 2019 IEEE International Congress on Internet of Things (ICIOT), Jul. 8-13, 2019, pp. 125-132 (Year: 2019).*

(Continued)

*Primary Examiner* — Daniel T Pellett
(74) *Attorney, Agent, or Firm* — CANTOR COLBURN LLP; Jared Chaney

(57) ABSTRACT

Aspects of the invention include training an optimal interpretable decision tree for regression using mixed-integer linear programming techniques. A non-limiting example computer-implemented method includes receiving, using a processor, input data that includes time-series data. The method further includes training, using a binary mixed-integer linear program of the processor, an ODT for regression based on the input data. During the training process one or more outliers are filtered out by a linear loss model that minimizes training loss and outlier loss.

20 Claims, 10 Drawing Sheets

(56) References Cited

U.S. PATENT DOCUMENTS

| | | | |
|---|---|---|---|
| 9,176,183 B2 | 11/2015 | Zhu et al. | |
| 2006/0111857 A1* | 5/2006 | Shah | G01D 1/00 |
| | | | 702/85 |
| 2009/0125155 A1 | 5/2009 | Hill et al. | |
| 2009/0319093 A1* | 12/2009 | Joos | H02J 3/38 |
| | | | 700/297 |
| 2014/0214736 A1 | 7/2014 | Kimmel et al. | |
| 2015/0379426 A1* | 12/2015 | Steele | G06N 5/025 |
| | | | 706/12 |

FOREIGN PATENT DOCUMENTS

| | | |
|---|---|---|
| JP | 4601492 B2 | 12/2010 |
| KR | 20190063836 A | 6/2019 |
| TW | I407325 B | 9/2013 |

OTHER PUBLICATIONS

Bertsimas et al., Optimal classification trees, Machine Learning (2017) 106, published Apr. 3, 2017, pp. 1039-1082 (Year: 2017).*

Bertsimas et al., Classification and Regression via Integer Optimization, Operations Research, vol. 55 No. 2, Mar.-Apr. 2007, pp. 252-271 (Year: 2007).*

Dunn, Jack William, Optimal Trees for Prediction and Prescription, Doctoral Thesis, Massachusetts Institute of Technology, Jun. 2018, 226 pages (Year: 2018).*

Aghaei, Sina et al. "Learning Optimal and Fair Decision Trees for Non-Discriminative Decision-Making", The Thirty-Third AAAI Conference on Artificial Intelligence (AAAI-19); retrieved at: https://www.aaai.org/ojs/index.php/AAAI/article/view/3943/3821; 2019; pp. 1418-1426.

Bertsimas, Dimitris et al. Optimal classification trees retrieved at: https://www.mit.edu/~dbertsim/papers/Machine%20Learning%20under%20a%20Modern%20Optimization%20Lens/Optimal_classification_trees_MachineLearning.pdf; Springer; ISSN 0885-6125, vol. 106, No. 7, 2017; 46 pgs.

Economakos C et al., "A supervisory control framework for set point tuning in industrial processes." Ei Compendex, 2005. 1 Page.

Gunluk, Oktay et al. "Optimal Decision Trees for Categorical Data via Integer Programming", retrieved at: http://www.optimization-online.org/DB_FILE/2018/01/6404.pdf; dated Aug. 13, 2019; 27 pgs.

Jiang Y et al., "Model Predictive Control-based Setpoint Regulation in Industrial Processes." Electronics & Communications Abstracts Journal, 2018 1 Page.

* cited by examiner

SYSTEM-LEVEL CONTROL USING TREE-BASED REGRESSION WITH OUTLIER REMOVAL

BACKGROUND

The present invention generally relates to programmable computers, and more specifically to programmable computers, computer-implemented methods, and computer program products configured and arranged to utilize tree-based regressions with outlier removal for quality mode prediction in manufacturing and process industries.

Computers utilize prediction models to perform process control in a variety of environments. For example, blast furnaces, oil refineries, and computer-based supply chain management systems all rely on programmable computers to implement process controls. In each of these environments, a prediction model can be built from a network of connected processes and inputs. Some inputs can be controllable, while others are not. For example, a prediction model for multi-period site-wide optimization of oil sands production can be built from the underlining controls (e.g., temperature and pressure set points) and uncontrollable fixed process conditions (e.g., feedstock quality). Each process within the overall workflow can include a self-contained set of inputs and outputs. The outflow from an upstream process can be used as an inflow to a downstream process. A complex relationship exists between the various set-points, material inflows, and throughput. Continuing from the previous example, a goal of the optimization model can be to provide the operational set point recommendations for each controllable variable in each process within the oil sands production workflow to maximize throughput.

Deep neural networks ("DNN") and optimal decision trees ("ODT") are two possible approaches for implementing the prediction models used in process controls. A DNN is an artificial neural network with multiple hidden layers between the input and output. A DNN finds the correct mathematical manipulations (internal weights) to turn the input into the output. An ODT is a tree-based regression model that recursively partitions a feature space and assigns a label to each resulting partition. The ODT then classifies data points according to these splits and labels. An ODT offers the same universal approximation power as a DNN (i.e., for any value E an ODT can be built with sufficient depth such that the difference in outputs between the ODT and a DNN are less than E) with improved interpretability (i.e., the block box nature of the DNN hidden layers is avoided).

Due to the combinatorial structure of decision trees, the two most prevalent ways of training ODTs are Boolean formula-based approaches and MILP (mixed-integer linear programming) based formulations. Many related MILP formulations have been proposed to train ODTs for different purposes. For example, through the use of mixed integer linear programming, global solutions to an ODT can be determined that are scalable.

There are problems with the use of MILP for training ODTs. For one, MILP is computationally intractable for large scale data sets. Moreover, the generalization behavior of a trained ODT under current MILP techniques is not significantly better than those from heuristics. Finally, the typical loss for training a regression model using MILP is the squared loss, but this loss is nonlinear and outliers cannot be removed.

SUMMARY

Embodiments of the present invention are directed to training an optimal interpretable decision tree using integer linear programming techniques. A non-limiting example computer-implemented method includes receiving, using a processor, input data that includes time-series data. The method further includes training, using a binary mixed-integer linear program of the processor, an ODT for regression based on the input data. During the training process one or more outliers are filtered out by a linear loss model that minimizes training loss and outlier loss.

The method can further include simultaneously training two or more ODTs at system level based on the input data. In some embodiments of the invention, the two or more ODTs include a first ODT and a second ODT downstream of the first ODT.

In one or more embodiments of the present invention, a gating function is configured to determine that an output from the first ODT includes an outlier. In some embodiments of the invention, the gating function is further configured to remove the outlier prior to training the downstream ODT.

In some embodiments of the invention, the ODT is a multivariable decision tree. In some embodiments of the invention, branching rules for the ODT are determined using binary mixed-integer linear programming. In some embodiments of the invention, minimizing training loss and outlier loss includes determining a linear loss model for each leaf of the ODT.

Embodiments of the present invention are directed to a system configured for real-time set point control. The system includes a memory and a processor communicatively coupled to the memory. The processor is operable to execute instructions stored in the memory. The instructions cause the processor to perform operations that include receiving input data that includes time-series data and a trained ODT with one or more multivariate hyperplanes. The instructions further cause the processor to identify, using the one or more multivariate hyperplanes, a current operating mode and a corresponding leaf node for a current operating point of a control variable. The instructions further cause the processor to calculate a next operating point for the control variable based on the current operating mode.

In some embodiments of the invention, the leaf node encodes a linear regression.

The method can further include recommending a control action based on the next operating point. In some embodiments of the invention, a user can be alerted when a difference between the current operating point and the next operating point is greater than a threshold value. In some embodiments of the invention, calculating the next operating point includes minimizing a total number of adjustments in the control variable. In some embodiments of the invention, the next operating point is within the current operating mode. In some embodiments of the invention, a prediction quality threshold must be satisfied prior to calculating the next operating point.

Other embodiments of the present invention implement features of the above-described method in computer program products.

Embodiments of the present invention provide an MILP-based training scheme for an ODT whereby a network of decision tree regression models for a sequential process are simultaneously trained with outlier removal. In case of large industrial systems, such as oil sands production and other such services, it is crucial to accurately and quickly determine setpoints from known starting conditions. ODTs trained according to one or more embodiments can be used to determine these setpoints dynamically. Embodiments of the present invention improve over existing MILP-based methods for training ODTs, which are sequential rather than simultaneous, and which are limited to minimizing training loss. Embodiments of the present invention automatically classify samples as outliers or points in the distribution. One or more embodiments of the present invention provide a gating function for downstream ODTs that removes these outliers prior to training, resulting in more efficient ODT training. The resulting ODT networks can be leveraged to improve process control (e.g., determining setpoints from a system distribution or other change in initial conditions).

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a robust decision-tree based learner designed to train simultaneously a network of decision tree regression models for a sequential process. When training a decision tree, a sample is automatically classified as either an outlier or a point in the distribution. Two types of losses will be calculated: outlier loss and train loss. According to some embodiments, only "reliable" (non-outlier) sample points from the previous decision trees will be passed to the downstream decision tree. In other words, outlier losses are purged prior to computing each decision tree. The use of tree-based regressions constructed in this manner can be used to improve quality mode predictions in manufacturing and process industries.

Figure 1:
FIG. 1 depicts a system-level optimal quality control scheme for a process according to embodiments of the invention.

Turning now to an overview of technologies that are specifically relevant to aspects of the present invention, FIG. 1 depicts a system-level optimal quality control scheme 100 for a process having control variables $x_1$ and $x_2$, processes P1 and P2, and process outputs $y_1$ and $y_2$. The scheme presented in FIG. 1 is meant to be illustrative only. It is understood that control schemes can be more or less complicated than shown. Moreover, while the illustrated scheme could represent any use-case, consider a crude oil refining process for ease of discussion. In a sequential process such as crude oil refining, in each time-period, $y_i$ (the quality of a product) needs to be predicted as a function of $x_i$ (the control variables) to identify optimal set-points. Control variables for downstream processes, $x_{i+1}$, are to be determined based on the quality grade of the upstream process, $y_i$. The prediction model of choice for this use-case needs to have the following properties: interpretability (the degree to which a human can understand the cause of a decision, e.g., why did the system predict "42" for this data point?), prediction quality (e.g., the empirical accuracy), and scalability (e.g., can the model scale as needed without suffering from bottlenecks? Can the model provide a fast inference time? Can the model be quickly optimized to get an optimal set-point for the plant?).

There are a variety of possible prediction model constructions available. Due to the acceleration of widely available and cheap computing power, various machine learning ("ML") techniques such as Deep Neural Networks ("DNN") have been leveraged to solve these types of problems. Complex DNNs can be built to provide models having almost arbitrarily high prediction quality. Unfortunately, prior ML attempts have problems with interpretability and ease of optimization. Deep neural networks, for example, are essentially black boxes with little to no insight into how the network is internally operating. Highly non-linear DNN models can also be difficult or time consuming to optimize.

Recently, optimal decision trees ("ODT") have been investigated for use in implementing the prediction models used in process controls. ODTs can provide an optimal trade-off between training accuracy and model simplicity. In fact, a key advantage of decision trees such as ODTs over other methods is that they are very interpretable, and in many applications, such as healthcare, this interpretability is often preferred over other methods that may have higher accuracy but are relatively uninterpretable.

Due to the combinatorial structure of decision trees, the two most prevalent ways of training ODTs are Boolean formula-based approaches and MILP (mixed-integer linear programming) based formulations. Historically, MILP has been rarely considered, mainly due to its poor tractability. However, with the development of MILP theory, optimization solvers, and hardware improvements, there has been an astonishing 800 billion factor speedup in MILP over the last 25 years. Therefore, the machine learning field is starting to embrace MILP-based models, and many methods are proposed to leverage mixed-integer programming to address classical machine learning tasks for which heuristics are traditionally employed.

Among the attempts to study the interplay between MILP and machine learning, constructing an ODT is among one of the most popular, mainly due to the combinatorial structure of a decision tree and its interpretability. Many related MILP formulations have been proposed to train ODTs for different purposes. For example, through the use of mixed integer linear programming, global solutions to an ODT can be determined that are scalable. MILP formulations offer other advantages as well. For example, MILP-based approaches provide a lot of freedom in formulating any specific tree structure (sometimes known as model simplicity), can leverage the current state-of-art MILP solver, and as noted by Bertsimas and Dunn, using MILP for "solving the decision tree problem to optimality yields trees that better reflect the ground truth in the data, refuting the belief that such optimal methods will simply overfit to the training set and not generalize well." (Bertsimas and Dunn: Machine learning, 2017).

As discussed previously herein, however, MILP-based approaches are computationally intractable for large scale data sets. Moreover, the generalization behavior of a trained ODT under current MILP techniques is not significantly better than those from heuristics. Finally, the typical loss for training a regression model using MILP is the squared loss, but this loss is nonlinear and outliers cannot be removed.

One or more embodiments of the present invention address one or more of the above-described shortcomings of the prior art by providing technical solutions, including an MILP-based training scheme for an ODT whereby a network of decision tree regression models for a sequential process are simultaneously trained with outlier removal. In other words, when training a decision tree, a sample is automatically classified as either an outlier or a point in the distribution. According to some embodiments, only "reliable" sample points from the previous decision trees will be passed to the downstream decision tree. Advantageously, the present training scheme offers the first nonlinear loss function for an MILP-based ODT that can both learn c and remove outliers. Here c is the model parameter for a linear regression at a leaf node of a decision tree that needs to be learned. In some embodiments of the invention, the nonlinear loss function is determined according to the following formula:

$$\sum_{i=1}^{n} z_i (c^\top x_i - y_i)^2 + \alpha \sum_{i=1}^{n} (1 - z_i) \quad (1)$$

where $z_i \in \{0, 1\}$ is a new variable for deciding whether a sample $(x_i, y_i)$ will be removed or not and $\alpha > 0$ is a weighting parameter to balance between the training error $z_i(c^T x_1 - y_i)^2$ and the cost to remove the sample $(x, y)$.

Figure 2:
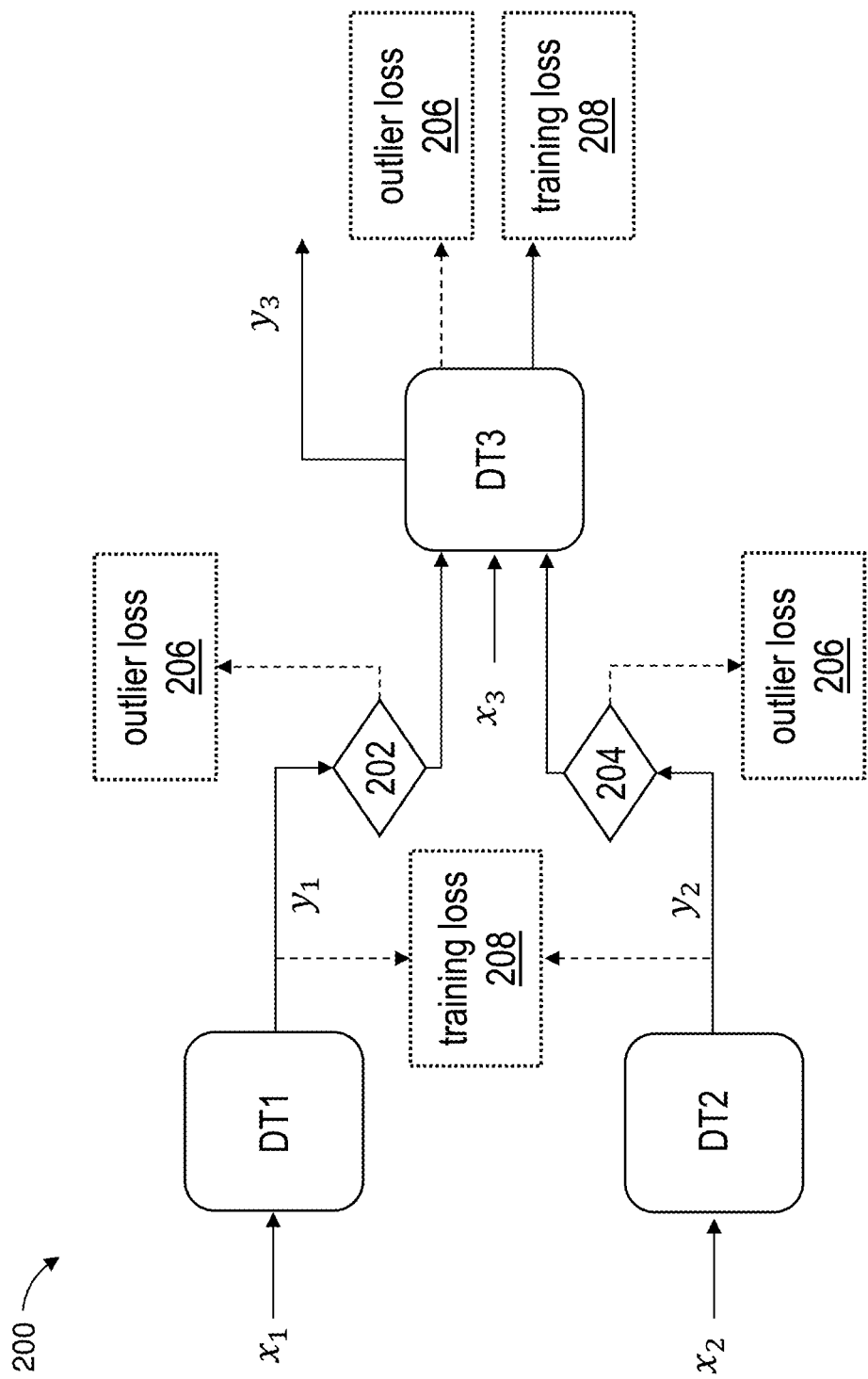
FIG. 2 depicts a block diagram of a simultaneous training scheme for an ODT implementation process with outlier removal according to embodiments of the invention.

Turning now to FIG. 2, a block diagram 200 of a simultaneous training scheme for an ODT implementation process with outlier removal is generally shown in accordance with one or more embodiments of the present invention. Here, decision trees DT1 and DT2 are coupled in parallel to a decision tree DT3. Input $x_1$ is coupled to decision tree DT1, input $x_2$ is coupled to decision tree DT2, and input $x_3$ is coupled to decision tree DT3. The scheme presented in FIG. 2 is meant to be illustrative only. It is understood that control schemes can be more or less complicated than shown. For example, a control scheme can include more or less decision trees configured similarly or differently than shown (e.g., in parallel, serial, or a combination).

In some embodiments of the invention, an outlier loss 206 and a training loss 208 is determined for each decision tree. In some embodiments of the invention, the outlier loss 206 and the training loss 208 are calculated according to a linear loss model, as discussed with respect to FIG. 3.

In some embodiments of the invention, the output $y_1$ of the decision tree DT1 is coupled to a gate 202. Similarly, the output $y_2$ of the decision tree DT2 can be coupled to a gate 204. In some embodiments of the invention, the gates 202 and 204 determine whether an incoming output data point (e.g., $y_1$ or $y_2$) from the upstream decision tree (e.g., DT1 or DT2, respectively) is an outlier. If so, the gates 202 and 204 remove the outlier and it is not passed as an input to train the downstream decision tree (e.g., DT3).

In some embodiments of the invention, each of the decision trees DT1, DT2, DT3, etc. are encoded as binary mixed-integer programming (MILP) ODTs for training and regression (i.e., to minimize regression loss). In some embodiments of the invention, an MILP technique for branching rules is leveraged to encode each decision tree. In some embodiments of the invention, MIP-based branching rules are leveraged to classify the decision trees. In some embodiments of the invention, a novel MILP formulation is leveraged for training ODTs for regression. Under this formulation we define a new loss function and a set of linear constraints.

To reiterate for convenience, following data-selection, the decision tree 300 can be constructed and optimized as follows. In some embodiments of the invention, this formulation is used train an optimal multivariate regression tree using a data-set comprising numerical features. These techniques can extend to data-sets with both numerical and categorical features. When using MILP to train a decision tree, in most cases it is preferable to train a multivariable decision tree than the classic single variable decision tree, since for single variable decision tree, it requires additional binary variables to enforce. As a generalization to single variable decision trees, multivariable decision trees are harder to train using common heuristic algorithms. The only difference between these two types of decision trees is whether a branching hyperplane has to be parallel to the axis or not. Since the multivariable decision tree is easier to train through an MILP model, the process is only described with respect to the optimal multivariable decision tree, even though the single variable decision tree can also be formulated by adding one more constraint for each branch node into the formulation.

For any $n \in Z_+$, let $[n]:=\{1, 2, \ldots, n\}$ denote a finite set of data points and $[d]=\{1, 2, \ldots, d\}$ be the index set of all features. The formulation is established for the balanced binary tree with depth D, even though the trained ODT can in fact be unbalanced. Let the set of branch nodes of the tree be denoted by $B:=\{1, \ldots, 2^D-1\}$, and the set of leaf nodes be denoted by $L:=\{2^D, \ldots, 2^{D+1}-1\}$. Let $A_R(I)$ and $A_L(I)$ denote the sets of ancestors of leaf node/whose right and left branches, respectively, are on the path from the root node to leaf node I.

Next, we define the variables to be used. Each data point $i \in [n]$ is denoted by $(x_i, y_i)$, where $x_i$ is a d-dimensional vector, and $y_i \in \mathbb{R}$. Since we train multivariate trees, we use a branching hyperplane at branch node b, denoted by $\langle h_b, z_i \rangle = g_b$, where $g_b$ is the bias term in the hyperplane. Indicator binary variable $e_{il}=1$ when the i-th sample enters leaf node l. We let $m_{ib}$ denote the slack variable for the soft margin for each sample point i corresponding to a hyperplane $\langle h_b, z_i \rangle = g_b$ used in the support vector machine (SVM)-type model. The objective for the learning problem attempts to minimize the total training error, the cost of outlier removal, the 1-norm SVM margin ($\Sigma_b \|h_b\|_1$) and the sum of slack variables for classification ambiguity subtracted ($\Sigma_{i,b} m_{ib}$) from the soft margin. Additionally, $\Sigma_b \|h_b\|_1$ helps promote sparsity for hyperplanes. Then, the MILP-ODT formulation is as follows:

$$\text{min training loss} + \text{outlier removal cost} + \alpha_1 \sum_{i \in [n], b \in \mathcal{B}} m_{ib} + \alpha_2 \sum_{b \in \mathcal{B}} \|h_b\|_1 \quad (2a)$$

Subject to the following constraints:

$$g_b - \sum_{j \in [d]} h_{bj} x_{ij} = p_{ib}^+ - p_{ib}^-, \forall i \in [n], b \in \mathcal{B} \quad (2b)$$

$$p_{ib}^+ \leq M(1 - e_{il}), \forall i \in [n], l \in \mathcal{L}, b \in A_R(l) \quad (2c)$$

$$p_{ib}^- + m_{ib} \geq \epsilon e_{il}, \forall i \in [n], l \in \mathcal{L}, b \in A_R(l) \quad (2d)$$

$$p_{ib}^- \leq M(1 - e_{il}), \forall i \in [n], l \in \mathcal{L}, b \in A_L(l) \quad (2e)$$

$$p_{ib}^+ + m_{ib} \geq \epsilon e_{il}, \forall i \in [n], l \in \mathcal{L}, b \in A_L(l) \quad (2f)$$

$$\sum_{l \in \mathcal{L}} e_{il} = 1, \forall i \in [n] \quad (2g)$$

$$h_{bj}, g_b \in \mathbb{R}, p_{ib}^+, p_{ib}^-, m_{ib} \in \mathbb{R}_+, e_{il} \in \{0, 1\} \quad (2h)$$

constraints for linearizing training loss. (2i)

Here, notice that $h_b$, $g_b$ and linear models $$c_l^T x$$

at leaf nodes are main decision variables to characterize a decision tree, while $p_{ib}^+$, $p_{ib}^-$, $m_{ib}$ and $e_{il}$ are derived variables for the MILP model.

Constraints (2b), (2c), and (2e) formulate the branching rule at each node $b \in B$ for routing a sample i: if i goes to the left branch at node b, then $g_b - \Sigma_{j \in [d]} h_{bj} x_{ij} \geq 0$, and if it goes to the right side, then $g_b - \Sigma_{j \in [d]} h_{bj} x_{ij} \leq 0$.

As per MILP convention, we formulate this relationship by separating $g_b - \Sigma_{j \in [d]} h_{bj} x_{ij}$ into a pair of complementary variables $$p_{ib}^+ \text{ and } p_{ib}^-$$

(meaning $$p_{ib}^+ \text{ and } p_{ib}^-$$

cannot both by strictly positive at the same time), and forcing one of these two variables to be 0 through the big-M method. Note that when i goes to the right branch, it should satisfy $g_b - \Sigma_{i \in [d]} h_{bj} x_{ij} < 0$ strictly. The only special case is when $$p_{ib}^+ = p_{ib}^- = 0.$$

However, due to the two constraints (2d), (2f), and the penalizing term $m_{ib} \geq 0$, this phenomenon cannot occur. Constraint (2g) enforces that each i should be assigned to exactly one leaf node.

Next, we present to how to define the training loss, the outlier removal cost, and constraints for linearizing training loss. To ensure the solution is scalable, a new training scheme is proposed for each leaf node of the decision tree. In this approach, the training loss 208 and the outlier loss 206 can be expressed according to the following formula:

$$\sum_{i=1}^{n} e_{il} z_i |c^T x_i - y_i| + \alpha \sum_{i=1}^{n} (1 - z_i) \quad (3)$$

where $$\sum_{i=1}^{n} e_{il} z_i |c^T x_i - y_i|$$

is the training loss and $$\alpha \sum_{i=1}^{n} (1 - z_i)$$

is the outlier where loss.

Figure 3:
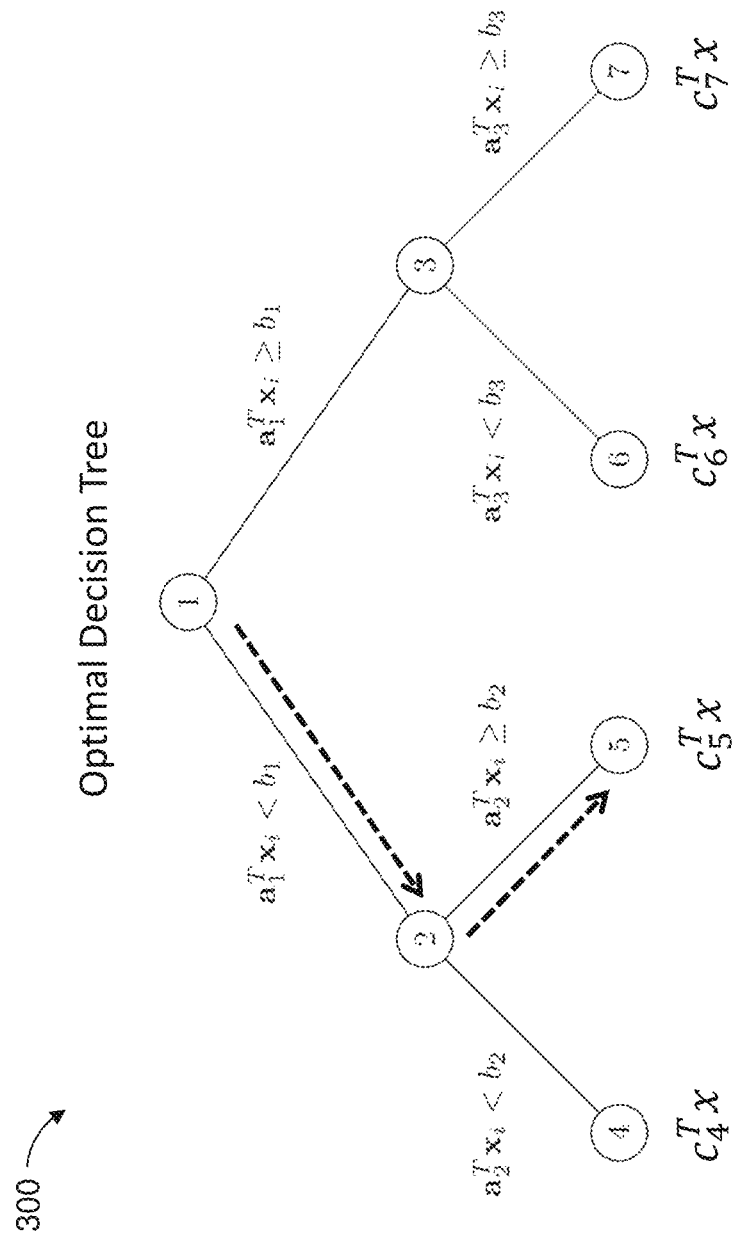
FIG. 3 depicts a binary decision tree constructed in accordance to an embodiment of the present invention.

FIG. 3 depicts an exemplary binary decision tree 300 constructed in accordance with one or more embodiments of the present invention. The decision tree 300 includes 7 nodes or leaves (denoted 1 through 7) arranged in balanced branches at a depth of 3, although other configurations are within the contemplated scope of the invention. For example, the decision tree 300 could be balanced or unbalanced and could include more or less nodes than shown. As shown in FIG. 3, at each node a branching determination is made according to a predetermined threshold. For example, node 2 branches to node 4 when the current parameter $$a_2^T x_i$$

is less than $b_2$ and branches to node 5 when the parameter is greater than or equal to $b_2$. These branching thresholds are for ease of discussion only and other thresholds are possible and within the contemplated scope of the invention.

In some embodiments of the invention, the training loss and outlier loss equation denoted previously in formula (3) can be solved for the decision tree 300 based on a linear loss model at a leaf node having the following constraints:

$$\min \sum_{i=1}^{n} u_i + \alpha \sum_{i=1}^{n} (1 - z_i) \quad (4)$$

$$c^T x_i - y_i \leq t_i$$

$$-c^T x_i + y_i \leq t_i$$

$$v_i \geq -M z_i$$

$$v_i \leq M z_i$$

$$v_i \geq t_i - M(1 - z_i)$$

$$v_i \leq t_i + M(1 - z_i)$$

-continued $$z_i \in \{0, 1\}$$
$$u_i \leq v_i$$
$$u_i \leq e_{il}$$
$$u_i \geq v_i + e_{il}$$

Where $u_i$, $v_i$, $t_i$ are additional variables that are used to decompose the nonlinear training loss function and M is a significantly big number (e.g, M=$10^6$). These constraints form the set of linear constraints (2i). In this manner, the model parameter c can be determined at each node of the decision tree 300 (e.g., $$c_4^T x, c_5^T x, c_6^T x,$$

etc.). This process (i.e., the process by which $$c_n^T x$$

is solved for each node n) is sometimes referred to as solving the training problem.

Training ODTs using MILP in this manner results in a training scheme that satisfies the three characteristics of an ideal prediction model: interpretability, prediction quality, and scalability.

Interpretability: To improve quality (under normal conditions) or maintain quality (under upstream process failure conditions), it is important to be able to explain or interpret which control variable(s) need(s) to be changed, in what order, and by what quantity. An ODT trained according to embodiments of the present invention naturally offers a high level of interpretability, as each node (or leaf) of the model is accessible and verifiable (no hidden layers).

Prediction quality: While current state-of-the-art heuristic based methods such as classification and regression trees (CART) may be used, prediction quality for these applications affects control variable values in downstream operations or for subsequent time-periods. In the present ODT scheme, an optimization-based approach is used to determine branching rules simultaneously in a multivariate space, improving prediction accuracy.

Scalability: in many internet-of-things (IOT) applications, prediction problems require high-dimensionality and large data sizes. Optimization formulations for ODTs are usually mixed-integer linear programming (MILP) based and hence NP-hard. Advantageously, the present invention offers a nonlinear scalable training method that can still be used to remove outliers, avoiding NP-hard solutions and providing a platform that can be used to predict quality for even complex scenarios.

Once a decision tree(s) is trained (i.e., once the model parameter c is known for each node of all decision trees), the decision tree(s) can be used for process control. For example, a model of trained decision trees can be used to determine setpoints (e.g., $x_{i+1}$) for an oil sands production process from a starting condition ($x_i$). The process of leveraging trained decision trees in this manner is sometimes referred to as solving the control problem.

One of the main features for solving the control problem using decision trees is the use of multivariate hyperplanes for splitting. In some embodiments of the invention, the characterization factors of a decision tree are given by branching hyper planes ( $$a_i^T x < b_i$$

) at each branch node, and linear regressions ( $$c_i^T x$$

) at each leaf node. In other words, an operating point specified by a vector of setpoints is located in a sub-region identified by hyperplanes and is regressed as per a linear model.

One advantage of the use of multivariate hyperplanes according to one or more embodiments is improved upset handling. In short, upset handling refers to the ways in which the system responds to an unexpected change in conditions (i.e., an upset). In the context of oil sands production, for example, an upset could refer to a change in feedstock flowrate, pressure, composition, etc. Ideally, given the current operating point Xo and an unexpected system outage (upset, etc.), the system should calculate the next operating point $x_1$ in a near-real time manner. Moreover, when there is an upset in the system, the control model should quickly adjust the outputs from some of processes to compensate for the loss of the failed process.

In some embodiments of the invention, upset handling leverages knowledge of the multivariate hyperplanes to improve the speed at which adjustments can be made. In some embodiments the system can be configured to find the next operating point in the same region (with respect to the multivariate hyperplanes) of the current one for $x_0$, and to minimize the number of adjustments made within that region of the hyperplanes.

Figure 4:
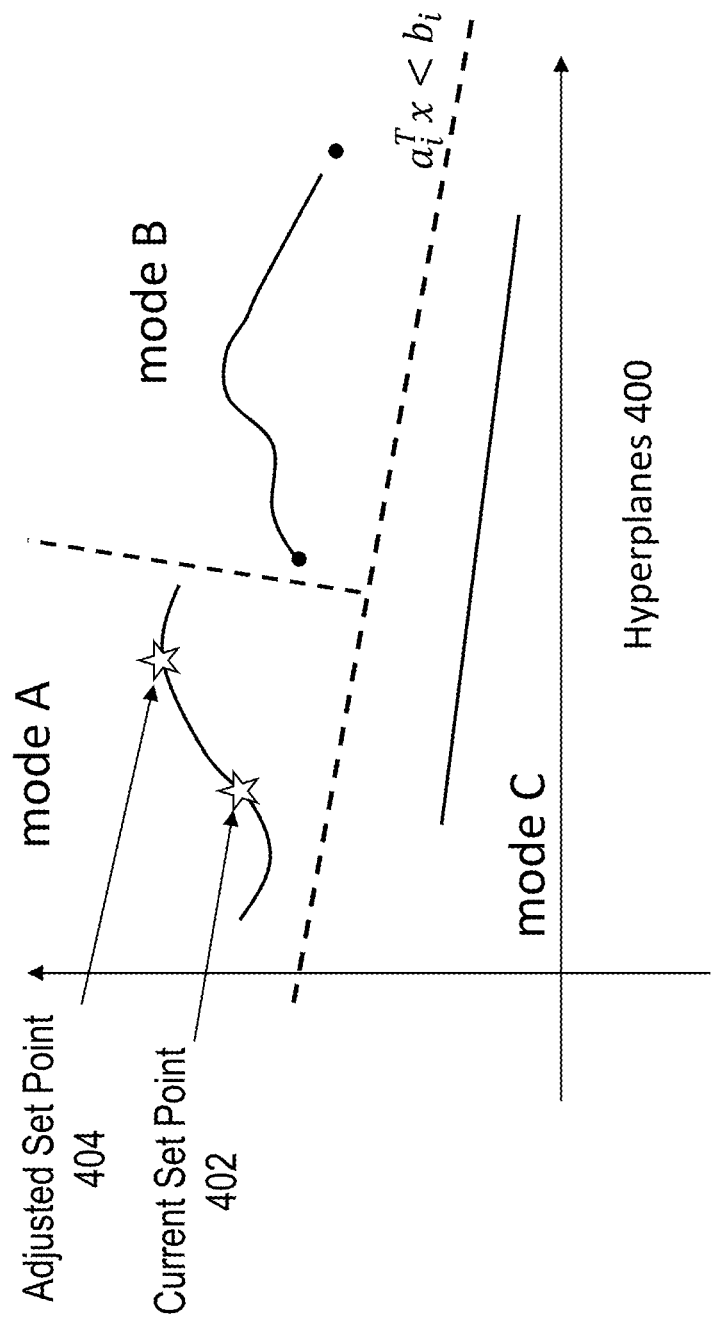
FIG. 4 depicts possible operating modes A, B, and C within hyperplanes constructed in accordance to an embodiment of the present invention.

To illustrate, consider the following example with respect to FIG. 4, depicting three operating modes A, B, and C within hyperplanes 400. Assume a process was operating at mode A with a current set point 402 ($x_0$) before an upset. The regression for Mode A is a leaf node of the decision tree of the control model (e.g., FIG. 3), defined by $$f(x) = c^T x.$$

In some embodiments of the invention, the system is configured, after the upset, to find an adjusted setpoint 404 in the same region of the hyperplane as the current set point 402 (e.g., within Mode A as opposed to Modes B or C). The region for Mode A is defined by the hyperplanes $$c_i^T x \leq b_j, \forall j \in I$$

that are obtained from the definition of the decision tree. In some embodiments of the invention, the variable $z \in \{0,1\}$ counts the number of changes in the control variables from xo to x. In this manner, the adjusted setpoint 404 is found according to the following equation:

$$\max_{x,x} \quad c^T x - \alpha \sum_{i=1}^{n} z_i \quad (5a)$$

where $\alpha > 0$ is a weighting parameter to balance between prediction output and the number of adjustments.

In some embodiments of the invention, the above equation is solved subject to the following constraints:

$$a_j^T x \leq b_j, \forall j \in I \quad (5b)$$

$$|x^i - x_0^i| \leq \delta |x_0^i|$$

$$l \leq x \leq u$$

$$-Mz \leq x - x_0 \leq Mz$$

$$z \in \{0, 1\}$$

where $M = 2 \ast \max\{|l_i|, |u_i|: i \in I\}$. Advantageously, equation (5a) is solvable using binary mixed-integer programming and a global optimizer can be identified quickly.

Figure 5:
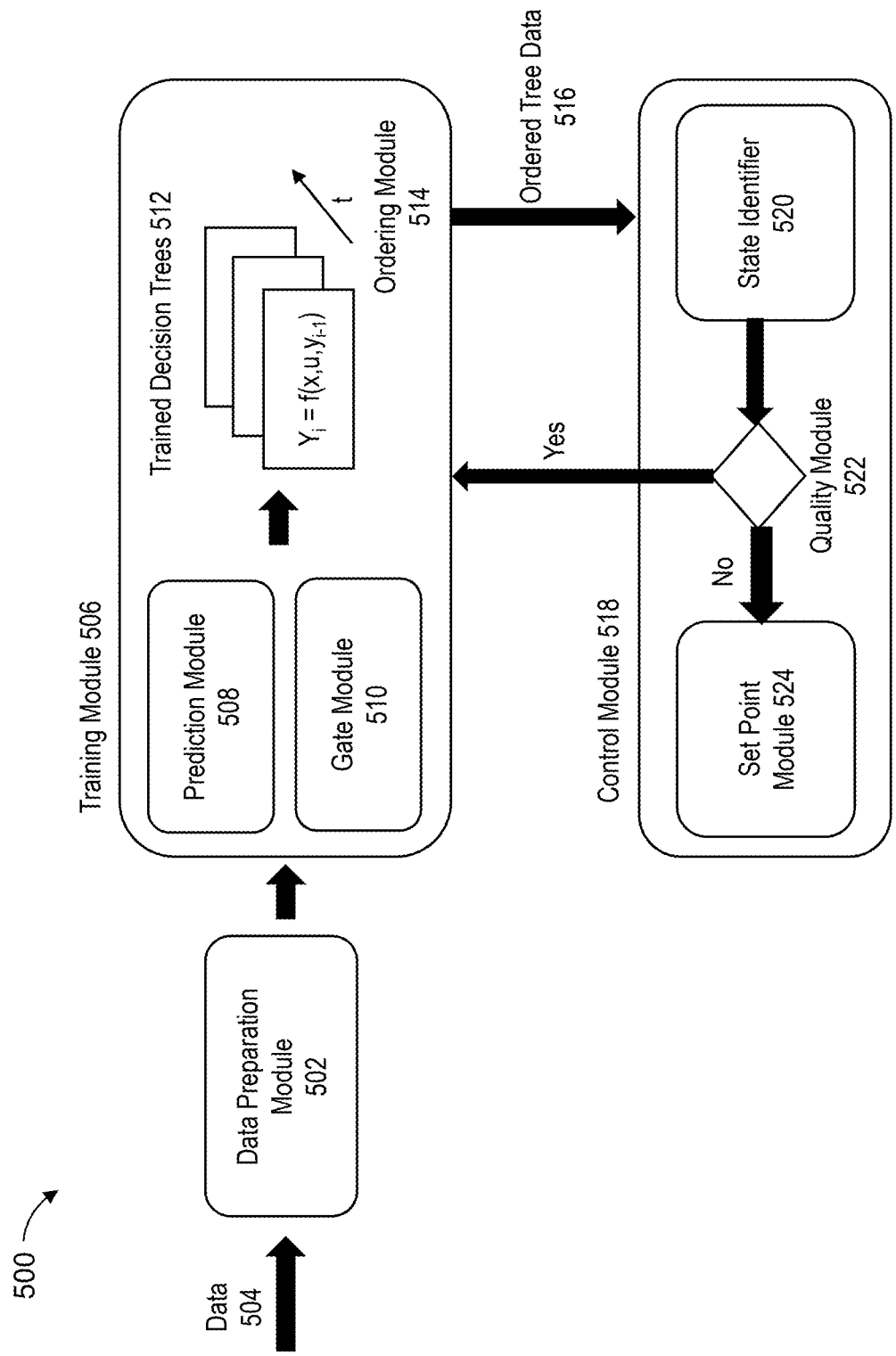
FIG. 5 is a block diagram of an MILP-based ODT training and control system with outlier removal constructed accordance to an embodiment of the present invention.

FIG. 5 depicts a block diagram of an MILP-based ODT training and control system 500 with outlier removal for quality mode prediction constructed in accordance with one or more embodiments of the present invention. In some embodiments of the invention, a data preparation module 502 receives data 504 from an upstream data link (e.g., a sensor, an upstream system, control data, etc.). The data 504 can be raw, aggregated time-series data with or without time shift.

In some embodiments of the invention, the data preparation module 502 is configured to identify individual, self-contained processes (e.g., plants) and their inputs, outputs, and observed variables. In one embodiment, this can be determined with SME inputs. Alternatively, or in addition, a preconfigured knowledge graph framework can be used to draw boundaries between sequential processes. In some embodiments of the invention, the data preparation module 502 is configured for feature engineering, feature extraction, data cleansing, and data imputation using known processes. In one embodiment, feature engineering and extraction steps are identified via SME inputs. In some embodiments of the invention, the data 504 is passed to a training module 506.

In some embodiments of the invention, the training module 506 is an MILP-based ODT training module with outlier removal. The training module 506 can include a prediction module 508. In some embodiments of the invention, the prediction module 508 can be configured to predict quality $y_i$ given input condition $x_i$ and uncontrollable variables $u_i$ for each upstream decision tree $DT_i$, by minimizing training loss and outlier loss. Training loss and outlier loss can be determined and minimized according to one or more embodiments, such as, for example, as discussed with respect to FIG. 3.

In some embodiments of the invention, the training module 506 can include a gate module 510. In some embodiments of the invention, the gate module 510 is configured to add, for each downstream decision tree $DT_i$, a gate that checks if a sample from an upstream decision tree $DT_{i-1}$ is an outlier. Outlier determinations can be made according to one or more embodiments, such as discussed with respect to FIG. 3. In some embodiments of the invention, outliers are determined according to a distance function. For example, a point x can be identified as an outlier if it lies outside a threshold distance from the average points in the hyperplane in which the point x sits. If so, the gate module 510 can be configured to remove the outlier so that it is not used to train the downstream decision tree $DT_i$.

In some embodiments of the invention, the training module 506 generates one or more trained decision trees 512 using the prediction module 508 and the gate module 510. In some embodiments of the invention, the training module 506 passes the one or more trained decision trees 512 to an ordering module 514. In some embodiments of the invention, the ordering module 514 is configured to determine a temporal ordering of the trained decision trees 512. In some embodiments of the invention, ordered tree data 516 is passed to a control module 518.

In some embodiments of the invention, the control module 518 can include a state identifier 520. The state identifier 520 can be configured to use the multivariate hyperplanes learned during training to identify a current operating mode and a corresponding leaf node of the current operating point xo.

In some embodiments of the invention, the control module 518 includes a quality module 522 that checks whether a prediction quality $P_i$ for the current operating point xo has degraded. In some embodiments of the invention, a check is done by comparing the predicted quality with the actual quality. If the predicted quality has indeed degraded, the system 500 returns to the training module 506 for additional training. In some embodiments of the invention, this cycle can continue until the quality module 522 determines that the prediction quality $P_i$ has not degraded beyond a predetermined threshold. If the quality module 522 determines that the prediction quality $P_i$ is sufficient (e.g., below the threshold requirement), the process can continue to a set point module 524. In some embodiments of the invention, a repository of trained ODTs is maintained in the system 500 to represent the transient nature of the underlying system (e.g., a processing plant). In some embodiments of the invention, the most recently trained model for each process is used by default for prediction at run-time. In some embodiments of the invention, the system 500 is configured to check for degradation in the prediction quality $P_i$ of the trained ODTs for each process and to retrain and/or update the prediction model from the repository.

In some embodiments of the invention, the set point module 524 is configured to calculate the next operating point $x_1$ given the current operating point xo. In some embodiments of the invention, the set point module 524 determines and sets the next operating point $x_1$ in real-time or near-real time. In some embodiments of the invention, the set point module 524 is configured to recommend set points to a user (e.g., a plant manager).

In some embodiments of the invention, the system 500 is configured to determine a quality factor of each intermediate product output by each process. In one embodiment, the quality factor is a vector that includes the percentage of each component present in the product. For example, the quality of an intermediate product can be determined by its chemical composition. In some embodiments of the invention, the set point module 524 is configured to generate an alert of any deviations in quality at each process level. In some embodiments of the invention, the system 500 is configured to train an ODT $DT_i$ to predict quality mode $y_i$ given input condition $x_i$ and uncontrollable variables $u_i$ for a process P at run-time.

Figure 6:
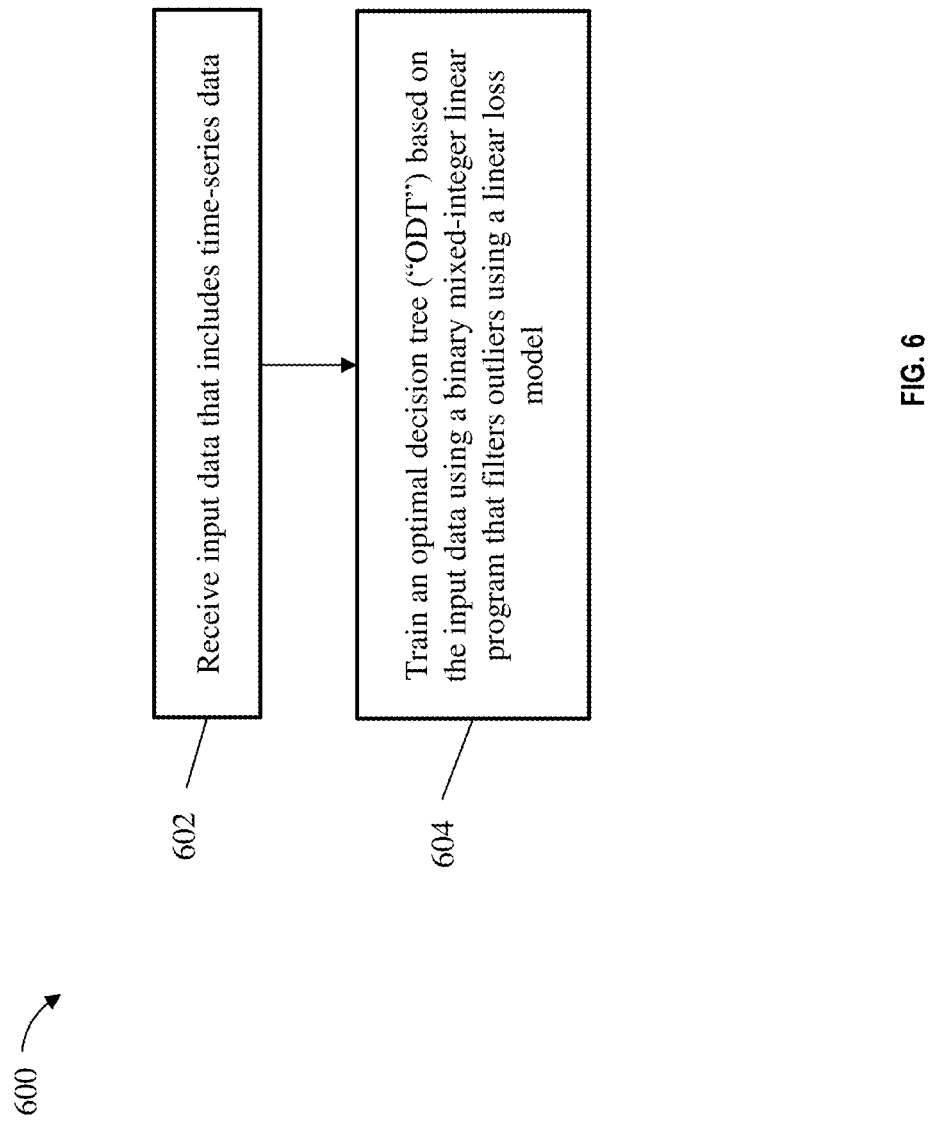
FIG. 6 depicts a flow diagram illustrating a method according to one or more embodiments of the invention.

FIG. 6 depicts a flow diagram 600 illustrating a method for training decision trees according to one or more embodiments of the invention. As shown at block 602, input data including time-series data can be received. In some embodiments of the invention, the input data includes the current set points of one or more control variables.

At block 604, an ODT is trained based on the input data. In some embodiments of the invention, the ODT is trained using a binary mixed-integer linear program. In some embodiments of the invention, one or more outliers are filtered out during the training process by minimizing training loss and outlier loss. In some embodiments of the invention, training loss and outlier loss can be minimized according to a linear loss model for each leaf of the ODT.

The method can further include simultaneously training two or more ODTs based on the input data. In some embodiments of the invention, the two or more ODTs include an upstream ODT and a downstream ODT. In some embodiments of the invention, a gating function is configured to determine whether an output from the upstream ODT comprises an outlier. In some embodiments of the invention, the gating function is further configured to remove the outlier prior to training the downstream ODT.

In some embodiments of the invention, the ODT is a multivariable decision tree. In some embodiments of the invention, branching rules for the ODT are determined using binary mixed-integer programming.

Figure 7:
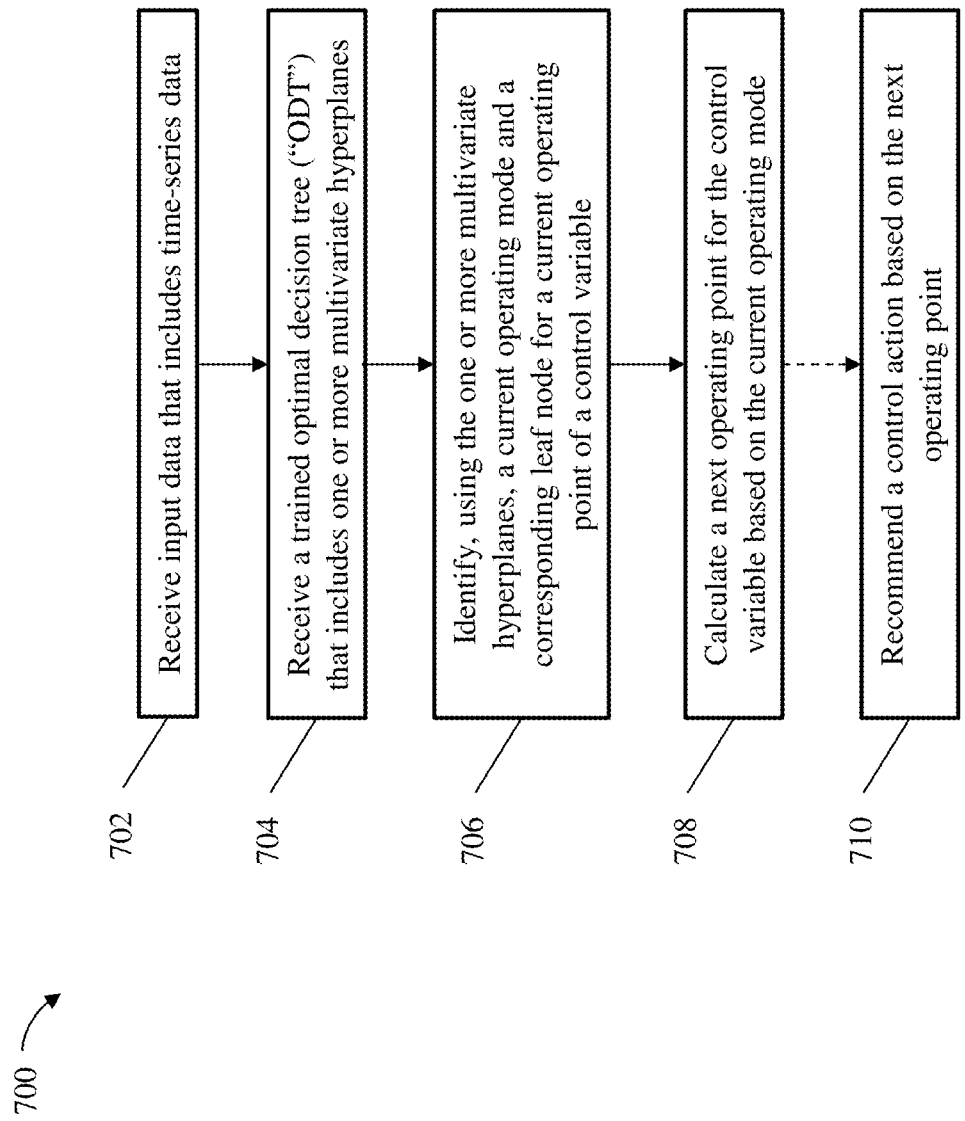
FIG. 7 depicts a flow diagram illustrating a method according to one or more embodiments of the invention.

FIG. 7 depicts a flow diagram 700 illustrating a system for controlling set points using decision trees trained according to one or more embodiments of the invention. As shown at block 702, a processor can receive input data that includes time-series data. At block 704, a trained ODT is received. The trained ODT can include one or more multivariate hyperplanes.

At block 706, the processor can identify, using the one or more multivariate hyperplanes, a current operating mode and a corresponding leaf node for a current operating point of a control variable. In some embodiments of the invention, each leaf node of the ODT comprises a linear regression.

At block 708, the processor can calculate a next operating point for the control variable based on the current operating mode. In some embodiments of the invention, calculating the next operating point comprises minimizing a total number of adjustments in the control variable. In some embodiments of the invention, the next operating point is selected from points within the current operating mode. In some embodiments of the invention, a prediction quality threshold must be satisfied prior to calculating the next operating point.

Optionally, at block 710, the processor can recommend a control action based on the next operating point. In some embodiments of the invention, the processor can alert a user when a difference between the current operating point and the next operating point is greater than a threshold value.

The process flow diagrams of FIGS. 6 and 7 are not intended to indicate that the operations of the methods 600 and 700 are to be executed in any particular order, or that all of the operations of the methods 600 and 700 are to be included in every case. Additionally, the methods 600 and 700 can include any suitable number of additional operations.

The processing methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer.

Embodiments of the present invention provide a new regression-based training ODT model that includes outlier removal. Presently available solutions to the technical problem of training a regression model using MILP rely on a squared loss function. While suitable for calculating training losses, such systems cannot accommodate for outliers due to the nonlinearity of the squared loss function. These approaches consequently struggle to correctly identify and handle short term effects, resulting in model outputs that can be unpredictable as well as inefficient.

Embodiments of the present invention address such technical challenges and deficiencies in the available solutions. In one or more embodiments of the present invention, a network of decision tree regression models for a sequential process are simultaneously trained with outlier removal. The present training scheme offers the first nonlinear loss function for an MILP-based ODT that can both learn c and remove outliers.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
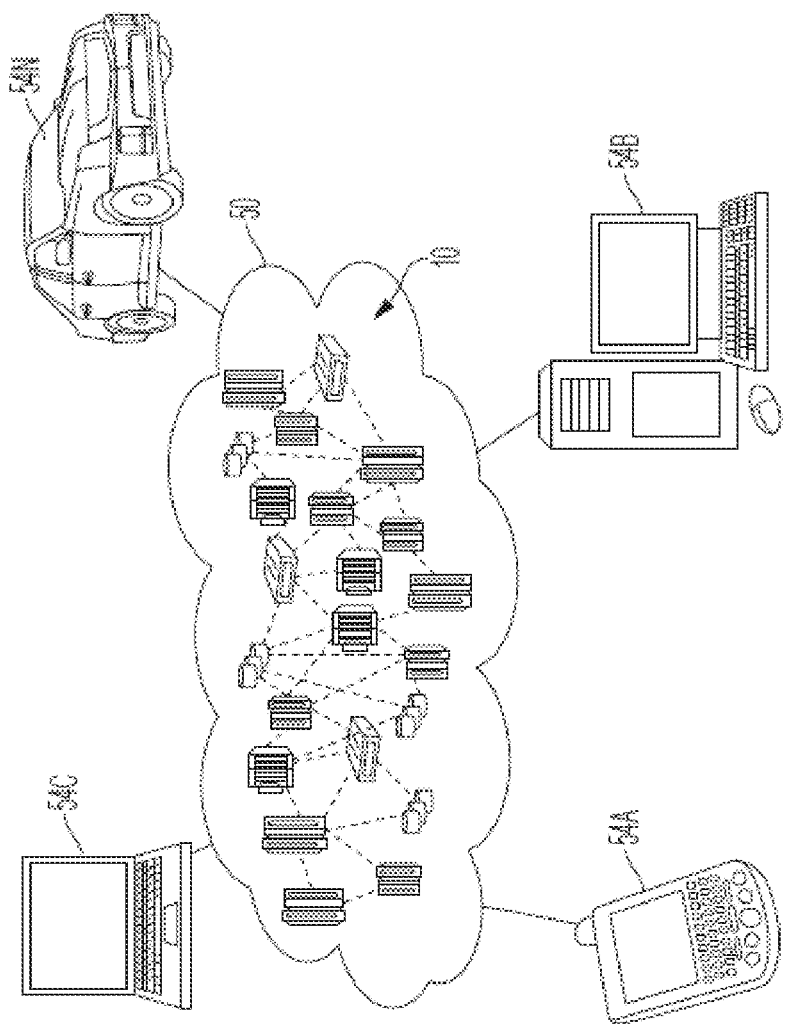
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
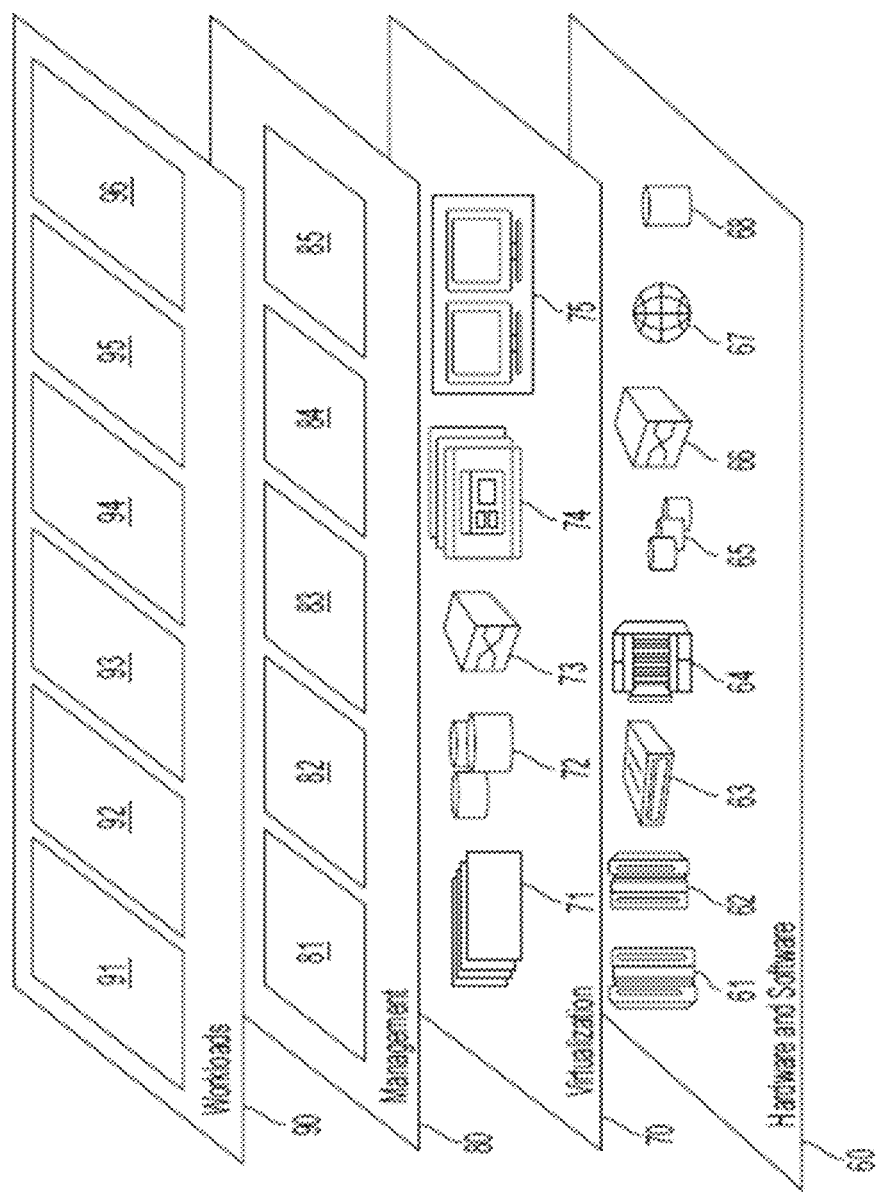
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ODT building and optimization processing 96.

Figure 10:
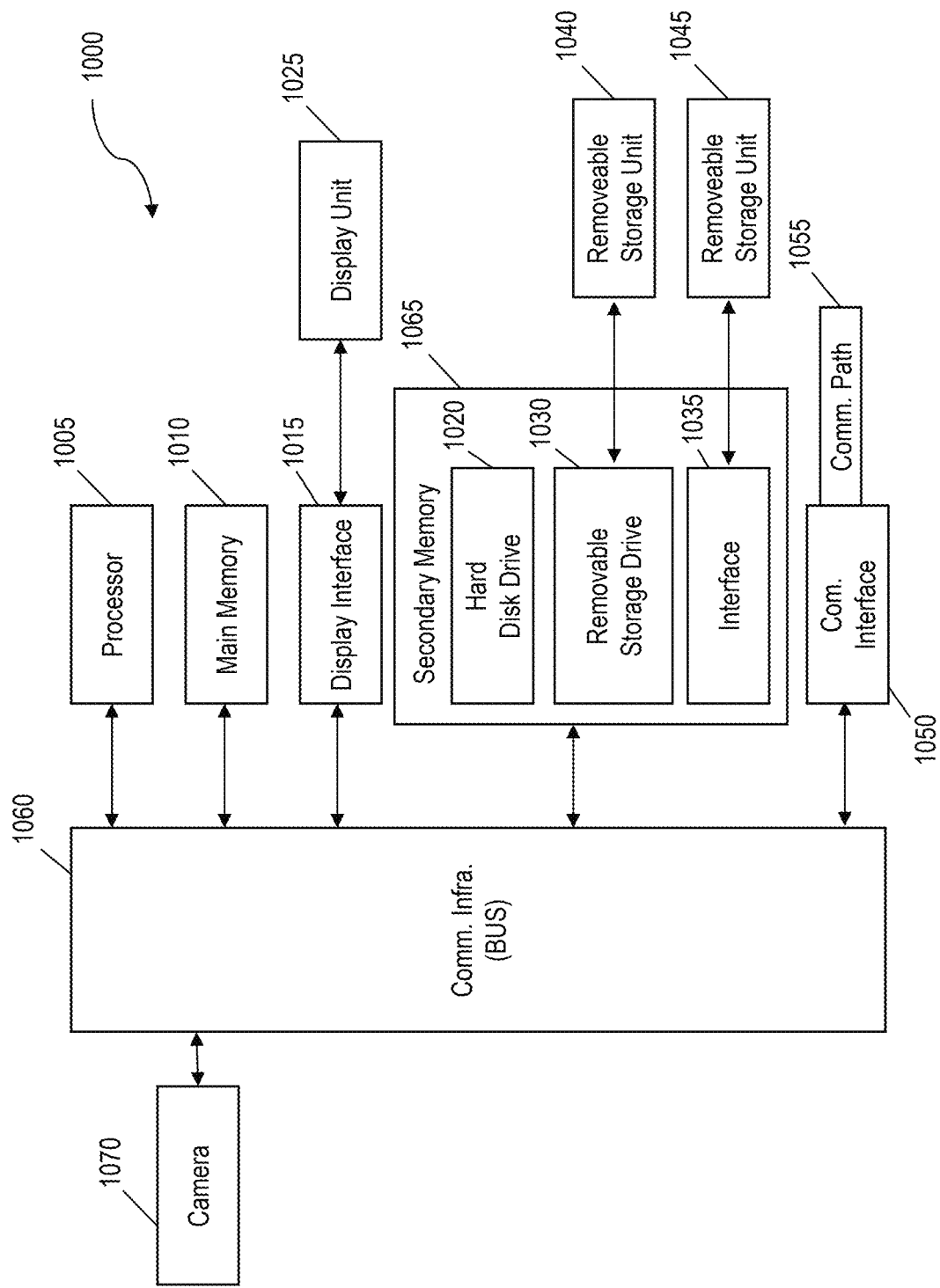
FIG. 10 depicts details of an exemplary computing system capable of implementing aspects of the invention.

FIG. 10 depicts details of an exemplary computing system capable of implementing aspects of the invention. FIG. 10 depicts a high level block diagram computer system 1000, which can be used to implement one or more aspects of the present invention. Computer system 1000 may act as a media device and implement the totality of the invention or it may act in concert with other computers and cloud-based systems to implement the invention. More specifically, computer system 1000 can be used to implement some hardware components of embodiments of the present invention. Although one exemplary computer system 1000 is shown, computer system 1000 includes a communication path 1055, which connects computer system 1000 to additional systems (not depicted) and can include one or more wide area networks (WANs) and/or local area networks (LANs) such as the Internet, intranet(s), and/or wireless communication network(s). Computer system 1000 and additional system are in communication via communication path 1055, e.g., to communicate data between them.

Computer system 1000 includes one or more processors, such as processor 1005. Processor 1005 is connected to a communication infrastructure 1060 (e.g., a communications bus, cross-over bar, or network). Computer system 1000 can include a display interface 1015 that forwards graphics, text, and other data from communication infrastructure 1060 (or from a frame buffer not shown) for display on a display unit 625. Computer system 1000 also includes a main memory 1010, preferably random access memory (RAM), and can also include a secondary memory 1065. Secondary memory 1065 can include, for example, a hard disk drive 1020 and/or a removable storage drive 1030, representing, for example, a floppy disk drive, a magnetic tape drive, or an optical disk drive. Removable storage drive 1030 reads from and/or writes to a removable storage unit 1040 in a manner well known to those having ordinary skill in the art. Removable storage unit 1040 represents, for example, a floppy disk, a compact disc, a magnetic tape, or an optical disk, etc. which is read by and written to by removable storage drive 1030. As will be appreciated, removable storage unit 1040 includes a computer readable medium having stored therein computer software and/or data.

In alternative embodiments, secondary memory 1065 can include other similar means for allowing computer programs or other instructions to be loaded into the computer system. Such means can include, for example, a removable storage unit 1045 and an interface 1035. Examples of such means can include a program package and package interface (such as that found in video game devices), a removable memory chip (such as an EPROM, or PROM) and associated socket, and other removable storage units 1045 and interfaces 1035 which allow software and data to be transferred from the removable storage unit 1045 to computer system 1000. In addition, a camera 1070 is in communication with processor 1005, main memory 1010, and other peripherals and storage through communications interface 1060.

Computer system 1000 can also include a communications interface 1050. Communications interface 1050 allows software and data to be transferred between the computer system and external devices. Examples of communications interface 1050 can include a modem, a network interface (such as an Ethernet card), a communications port, or a PCM-CIA slot and card, etcetera. Software and data transferred via communications interface 1050 are in the form of signals which can be, for example, electronic, electromagnetic, optical, or other signals capable of being received by communications interface 1050. These signals are provided to communications interface 1050 via communication path (i.e., channel) 1055. Communication path 1055 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 1010 and secondary memory 1065, removable storage drive 1030, and a hard disk installed in hard disk drive 1020. Computer programs (also called computer control logic) are stored in main memory 1010 and/or secondary memory 1065. Computer programs can also be received via communications interface 1050. Such computer programs, when run, enable the computer system to perform the features of the present invention as discussed herein. In particular, the computer programs, when run, enable processor 1005 to perform the features of the computer system. Accordingly, such computer programs represent controllers of the computer system.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The invention claimed is:

1. A computer-implemented method comprising:
receiving, using a processor, input data comprising time-series data; and
simultaneously training, using a binary mixed-integer linear program of the processor, a network of optimal decision trees ("ODTs") for regression based on the input data, the network of ODTs configured such that each ODT of the network of ODTs comprises at least one of an upstream ODT and a downstream ODT, wherein an output of an upstream ODT is coupled to an input of a downstream ODT;
wherein during the training of each respective downstream ODT:
a sample, output from a respective upstream ODT, is classified as either an outlier or a point in a distribution according to a minimizing of a nonlinear loss function in which training loss and outlier loss are minimized together, the nonlinear loss function determined according to the following formula:

$$\sum\nolimits_{i=1}^{n} z_i (c^T x_i - y_i)^2 + \alpha \sum\nolimits_{i=1}^{n} (1 - z_i)$$

where $z_i \in \{0, 1\}$ is a selection variable for deciding whether a sample $(x_i, y_i)$ will be removed or not, $\alpha > 0$ is a weighting parameter to balance between the training error $z_i(c^T x_i - y_i)^2$ and the outlier loss $$\alpha \sum\nolimits_{i=1}^{n} (1 - z_i)$$

n is a total number of samples, $c^T$ is a learned model parameter for a linear regression at a leaf node of the respective ODT, and T represents the transpose of c; and
each sample classified as an outlier is removed from the respective input of the respective downstream ODT, thereby training the respective downstream ODT only on samples that do not contain any outliers; and
controlling a set point for a manufacturing process undergoing an upset condition using the trained network of ODTs, wherein characterization factors of an underlying decision tree of the network of ODTs are given by branching hyperplanes at each branch node and linear regressions at each leaf node.

2. The computer-implemented method of claim 1, wherein the network of ODTs comprises a first ODT and a second ODT downstream of the first ODT.

3. The computer-implemented method of claim 2 further comprising a gating function configured to determine that an output from the first ODT comprises an outlier.

4. The computer-implemented method of claim 3, wherein the gating function is further configured to remove the outlier prior to training the second ODT.

5. The computer-implemented method of claim 1, wherein branching rules for the ODTs are determined using binary mixed-integer linear programming.

6. The computer-implemented method of claim 5, wherein each of the ODTs comprises a multivariable decision tree.

7. The computer-implemented method of claim 1, further comprising determining a linear loss model for each leaf of the network of ODTs.

8. A system comprising:
a memory;
a processor communicatively coupled to the memory, the processor operable to execute instructions stored in the memory, the instructions causing the processor to perform operations comprising:
receive input data comprising time-series data;
receive a simultaneously trained network of optimal decision trees ("ODTs") for regression comprising one or more multivariate hyperplanes, the network of ODTs configured such that each ODT of the network of ODTs comprises at least one of an upstream ODT and a downstream ODT, wherein an output of an upstream ODT is coupled to an input of a downstream ODT, wherein, during the training of each respective downstream ODT:
a sample, output from a respective upstream ODT, is classified as either an outlier or a point in a distribution according to a minimizing of a nonlinear loss function in which training loss and outlier loss are minimized together, the nonlinear loss function determined according to the following formula:

$$\sum_{i=1}^{n} z_i(c^T x_i - y_i)^2 + \alpha \sum_{i=1}^{n} (1 - z_i)$$

where $z_i \in \{0, 1\}$ is a selection variable for deciding whether a sample $(x_i, y_i)$ will be removed or not, $\alpha > 0$ is a weighting parameter to balance between the training error $z_i(c^T x_i - y_i)^2$ and the outlier loss $$\alpha \sum_{i=1}^{n} (1 - z_i)$$

n is a total number of samples, $c^T$ is a learned model parameter for a linear regression at a leaf node of the respective ODT, and T represents the transpose of c; and
each sample classified as an outlier is removed from the respective input of the respective downstream ODT, thereby training the respective downstream ODT only on samples that do not contain any outliers; and
identify, using the one or more multivariate hyperplanes, a current operating mode and a corresponding leaf node for a current operating point of a control variable; and
calculate a next operating point for the control variable based on the current operating mode for a manufacturing process undergoing an upset condition, wherein characterization factors of an underlying decision tree of the network of ODTs are given by branching hyperplanes at each branch node and linear regressions at each leaf node.

9. The system of claim 8, wherein the leaf node comprises a linear regression.

10. The system of claim 8, wherein the instructions further cause the processor to recommend a control action based on the next operating point.

11. The system of claim 8, wherein the instructions further cause the processor to alert a user when a difference between the current operating point and the next operating point is greater than a threshold value.

12. The system of claim 8, wherein calculating the next operating point comprises minimizing a total number of adjustments in the control variable.

13. The system of claim 8, wherein the next operating point is within the current operating mode.

14. The system of claim 8, wherein a prediction quality threshold must be satisfied prior to calculating the next operating point.

15. A computer program product for creating and optimizing a decision tree, the computer program product comprising a computer readable storage medium having program instructions embodied therewith, the program instructions executable by a computer, to cause the computer to perform operations comprising:
receiving input data comprising time-series data;
simultaneously training, using a binary mixed-integer linear program, a network of optimal decision trees ("ODTs") for regression based on the input data, the network of ODTs configured such that each ODT of the network of ODTs comprises at least one of an upstream ODT and a downstream ODT, wherein an output of an upstream ODT is coupled to an input of a downstream ODT;
wherein during the training of each respective downstream ODT:
a sample, output from a respective upstream ODT, is classified as either an outlier or a point in a distribution according to a minimizing of a nonlinear loss function in which training loss and outlier loss are minimized together, the nonlinear loss function determined according to the following formula:

$$\sum_{i=1}^{n} z_i(c^T x_i - y_i)^2 + \alpha \sum_{i=1}^{n} (1 - z_i)$$

where $z_i \in \{0, 1\}$ is a selection variable for deciding whether a sample $(x_i, y_i)$ will be removed or not, $\alpha > 0$ is a weighting parameter to balance between the training error $z_i(c^T x_i - y_i)^2$ and the outlier loss $$\alpha \sum_{i=1}^{n} (1 - z_i)$$

n is a total number of samples, $c^T$ is a learned model parameter for a linear regression at a leaf node of the respective ODT, and T represents the transpose of c; and
each sample classified as an outlier is removed from the respective input of the respective downstream ODT, thereby training the respective downstream ODT only on samples that do not contain any outliers; and
controlling a set point for a manufacturing process undergoing an upset condition using the trained network of ODTs, wherein characterization factors of an underlying decision tree of the network of ODTs are given by branching hyperplanes at each branch node and linear regressions at each leaf node.

16. The computer program product of claim 15, wherein the network of ODTs are simultaneously trained at system level based on the input data, the network of ODTs comprising a first ODT and a second ODT downstream of the first ODT.

17. The computer program product of claim 16 further comprising a gating function configured to determine whether an output from the first ODT comprises an outlier.

18. The computer program product of claim 17, wherein the gating function is further configured to remove the outlier prior to training the second ODT.

19. The computer program product of claim 15, wherein branching rules for the ODTs are determined using binary mixed-integer programming.

20. The computer program product of claim 15, wherein each of the ODTs comprises a multivariable decision tree.

* * * * *